United States Patent [19]

Rozek

[11] Patent Number: 4,842,095

[45] Date of Patent: Jun. 27, 1989

[54] UNITARY ANTI-SKID VIBRATION DAMPENING STRUCTURE

[75] Inventor: Roy J. Rozek, Plymouth, Wis.

[73] Assignee: Thomas Industries, Inc., Sheboygan, Wis.

[21] Appl. No.: 46,247

[22] Filed: May 4, 1987

[51] Int. Cl.⁴ ............................................. F16F 7/12
[52] U.S. Cl. ................................... 181/207; 181/290;
  181/294; 248/188.8; 248/359.1; 248/615;
  248/634; 248/638; 248/677
[58] Field of Search ............... 181/207, 208, 290, 294,
  181/DIG. 1; 248/188.8, 188.9, 359.1, 205.3,
  632–638, 677, 615

[56] References Cited

U.S. PATENT DOCUMENTS

| | | | |
|---|---|---|---|
| 1,858,752 | 5/1932 | Sentney | 181/207 X |
| 2,088,566 | 8/1937 | Avery | 248/615 |
| 2,641,426 | 6/1953 | Rauscher | 248/632 X |
| 3,087,571 | 4/1963 | Kerwin, Jr. | 181/208 |
| 3,573,401 | 4/1971 | Lininger | 248/188.9 X |
| 4,399,851 | 8/1983 | Bschorr | 181/208 X |

Primary Examiner—B. R. Fuller
Attorney, Agent, or Firm—James G. Staples

[57] ABSTRACT

A combination skid resistant and vibration dampening device formed from rubber-like material having a high coefficient of friction which is integrally bonded to cellular foam type material which has high impact absorption capacity.

6 Claims, 1 Drawing Sheet

UNITARY ANTI-SKID VIBRATION DAMPENING STRUCTURE

FIELD OF THE INVENTION

This invention relates generally to skid resistant and vibration dampening mounting pads and, more specifically, to a vibration generating assembly having a combined skid resistant and vibration dampening mounting means which functions to maintain the vibration generating assembly in fixed relationship to a support surface.

BACKGROUND OF THE INVENTION

Unintentional movement of vibration generating assemblies, such as fractional horsepower motorized devices, from an initial location in a common problem. In the hospital environment, for example, aspirators are frequently placed on a flat surface next to a patient and operate to drain fluids from the patient. The therapist using an aspirator would typically be performing the medical suctioning near the patient and would not be monitoring the aspirator device. The operation of the aspirator can be disrupted if the vibrations inherent in its operation cause it to move about on its support surface and foul the flexible fluid lines, or even fall off onto the floor. Interruption of operation in such cases can have disastrous effects on the patient as well as do damage to or destroy the apparatus.

To prevent this undesirable result, attempts have been made to provide mounting pads for such apparatus. Experience has shown, however, that mounting pad materials which are effective to dampen vibrations are often not effective to prevent skidding of the vibration-dampened assembly when an external force moves the machine, as by accidental bumping or negligent operation. By the same token, mounting pad materials which are effective to preclude skidding of the device on which they are employed are frequently deficient in the ability to dampen vibrations generated in the operation of the device. As a result, the efficiency of the unit is compromised as, for example, when vibratory movements result in difficult or inaccurate gauge readings.

SUMMARY OF THE INVENTION

The invention consists of a uniquely constructed mounting pad which functions both as a structural support member and as a skid resistant and vibration dampening means for a vibration susceptible apparatus, such as a fractional horsepower machine to which vibrations are transmitted or in which vibrations are induced during normal operation.

Accordingly, a primary object of the invention is to provide a mounting member which combines both skid resistant and vibration dampening characteristics into the same physical structure.

A further object is to provide a mounting member as above described in the form of a mounting pad which is composed of two distinct materials with respect to skid resistance and vibration dampening properties, yet are so well integrated that they comprise a single, unitary structure.

Another object is to provide a vibrationist generating assembly which includes a mounting structure effective to resist skidding and dampen vibrations associated with operation of the assembly.

Other objects and advantages of the invention will become apparent from a study of the following description of the invention.

BRIEF DESCRIPTION OF THE DRAWING

The invention is illustrated more or less diagrammatically in the accompanying drawing wherein.

DESCRIPTION OF A PREFERRED EMBODIMENT

Figure 1:
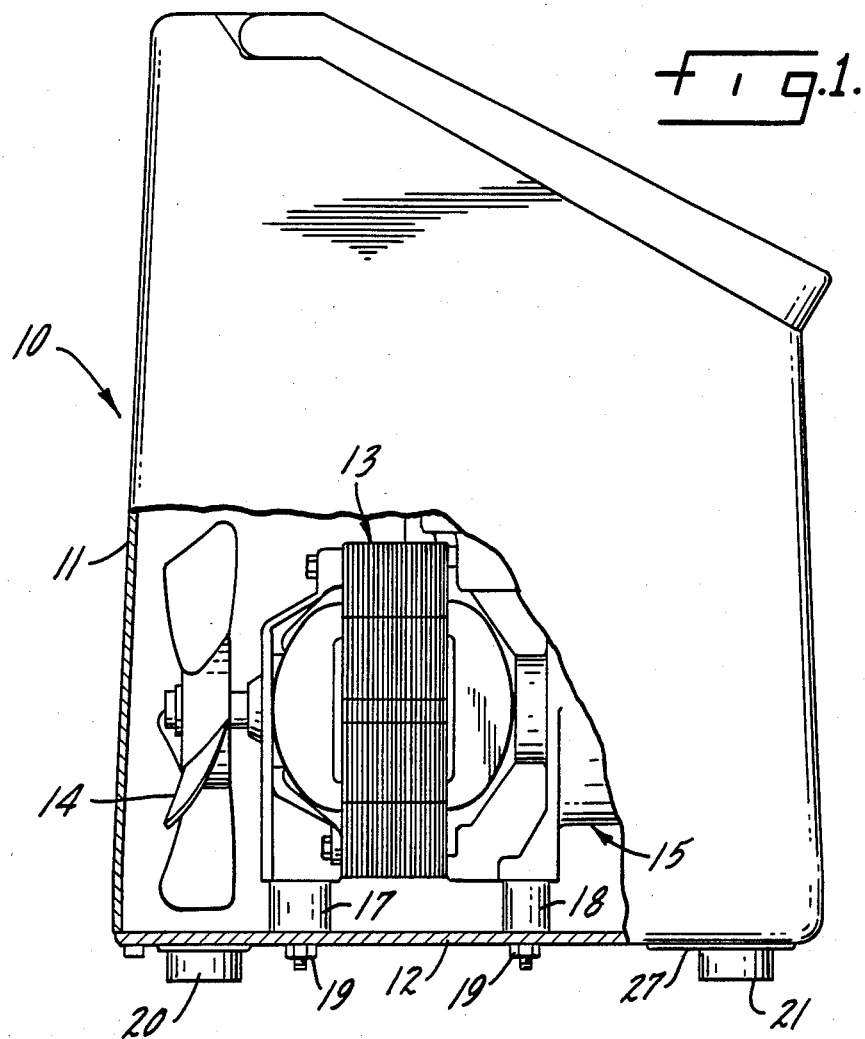
FIG. 1 is an elevation, with parts broken away for clarity, of a vibration generating assembly, here a nebulizer powered by a fractional horsepower motor, which includes mounting structure for resisting skidding of the unit and dampening vibrations derived from normal operations.

Like reference numerals will be used to refer to like parts from Figure to Figure in the drawing.

Referring to FIG. 1, an aspirator for use in a hospital environment is indicated generally at 10. An aspirator has been illustrated because it is a typical environment of an apparatus which comprises a portion of the present invention, and illustrates the importance of a structure which has the characteristics hereinafter described. The aspirator includes a casing 11 which has a bottom plate 12. The lower wall of the casing is broken away to disclose a fractional horsepower motor, indicated generally at 13, which powers a fan. The motor in turn drives any desired apparatus such as, in this instance, a valved air compressor, indicated generally at 15.

Since the specific component which the motor 13 drives is not essential to an understanding, nor an integral part of the invention, it is not hereafter further described. Suffice it to say that any apparatus which requires a power source, such as the motor 13, may be housed in the casing 11.

The motor 13 is, in this instance, connected to the bottom plate 12 by connectors 17, 18 via screws and bolts 19. Since the sleeve connectors 17 and 18 are semi-rigid, it will be understood that any vibrations generated by the fractional horsepower motor 13 are imparted to the bottom plate 12, and hence casing 11 and therefore the entire aspirator and all its contents.

In order to preclude undesired movement of the aspirator as a whole away from a fixed position with respect to a support surface, a plurality of mounting pads are employed to both prevent movement of the aspirator assembly away from the fixed position on the support surface, and dampen vibrations generated by the fractional horsepower motor so that no impacts are transmitted by the aspirator assembly to the support structure. It will be understood that a number of mounting pads may be employed, and in this instance two are indicated at 20 and 21. Since the construction of each pad is identical, only one will be described in detail.

Figures 2, 3:
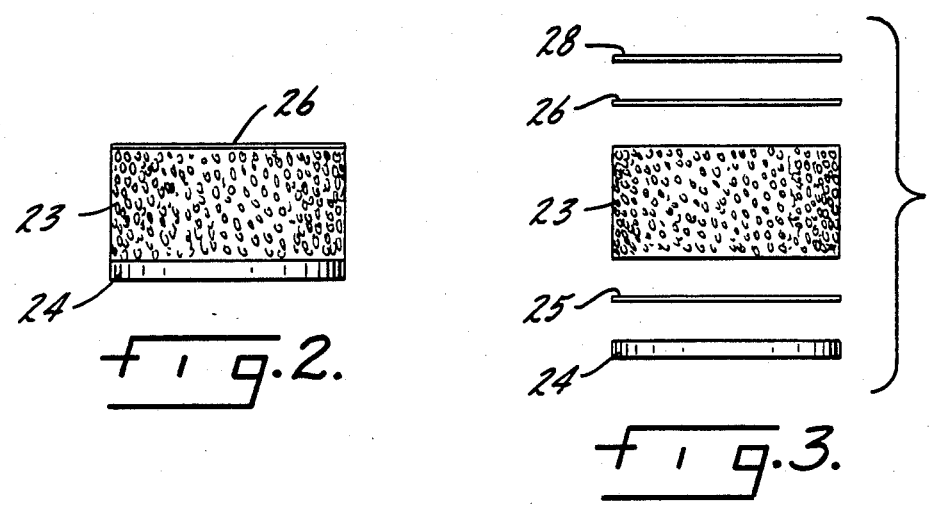
FIG. 2 is a side view to an enlarged scale of the mounting pad of the device of FIG. 1.
FIG. 3 is an exploded view of the unitary skid resisting and vibration dampening structure of this invention in a condition preparatory to attachment to a device with which it is intended to be used.

As best seen in FIGS. 2 and, particularly, FIG. 3, the mounting pad consists of essentially a first portion, indicated at 23, a second portion indicated at 24 and an integrating portion, indicated at 25, the integrating portion being composed of a material which joins the first portion 23 to the second portion 24 in a manner which obliterates a sharp line of demarcation between the first and second portions. In effect, the integrating portion 25 fuses the first portion 23 to the second portion 24 as best seen in FIG. 2. Any suitable means can be used to connect a mounting pad 20 or 21 to the casing 11. In this instance, adhesive means have been illustrated at 26 to secure the mounting pad to a receiving surface, such as the lower surface of boss 27.

FIG. 3 illustrates the mounting pad in the condition it takes when manufactured as a separate unit to be later assembled with a structure which requires adhesion of the operating portion of the member. A peelable protective liner, such as a conventional releasable Kraft paper which is compatible with the adhesive 26 is shown at 28.

The portion 24 is a special skid resistant urethane which can be obtained from the 3M Company of Minneapolis, Minn. under the stock number SJ 5916.

The skid resistant urethane is bonded to a layer of a cellular urethane identified by the trademark PORON, and available from Kent Manufacturing Company of Grand Rapids, Mich. under the designation 4701-cellular urethane. The cellular urethane of portion 23 has a very low compression set of less than 2%, and a Shore Sclerscope "A" rating of 7-9 up to 26, depending upon the application required. Typical tensile strengths range from 55 to 250 psi, with elongations in the range of 100%.

Adhesive which forms the integrating portion 25 is a 3M adhesive identified as number 9485 which has the capacity of fusing portions 23 and 24 to one another so that an integral member is the result.

In use, a typical mounting pad with one bearing surface coated with the appropriate adhesive and protected by a quick release paper is attached, after removal of the quick release paper, to the underside of boss 27. After a suitable number has been placed on the apparatus, the apparatus may be simply set on a support surface and operated. The cellular urethane functions to absorb the vibrations inherent in the operation of the device, usually as derived from a fractional horsepower motor as indicated at 13, and the second portion 24 is operative to preclude movement of the apparatus across the support surface because of the very high co-efficient of friction inherent in the material which forms the second portion.

Although a preferred embodiment of the invention has been illustrated and described, it will at once be apparent that modifications may be made within the spirit and scope of the invention. Accordingly, it is intended that the scope of the invention be limited solely by the scope of the hereafter appended claims when interpreted in light of the relevant prior art, and not solely by the foregoing exemplary description.

I claim:

1. In an apparatus subject to vibration, the combination of
   an apparatus capable of being vibrated,
   means for vibrating said apparatus whereby relative movement is capable of being induced between said apparatus and a support surface and
   a skid resistant and vibration dampening member disposed between said apparatus and said support surface, said member including
   a first portion, said first portion being composed of a material having characteristics, with respect to texture and deformability, of non-rigid cellular foam, and having therefore the characteristics of high absorption of vibratory shocks per unit volume of material,
   a second portion, said second portion being composed of a material having characteristics, with respect to texture and deformability, of rubber, and having a high coefficient of friction,
   an integrating material which joins the first portion to the second portion in a manner which obliterates a sharp line of demarcation between the two portions.
   to thereby form a structurally integral skid resistant and vibratory dampening member.

2. The apparatus of claim 1 further characterized by and including
   adhesive means associated with at least one exterior bearing surface of said member.

3. The apparatus of either one of claims 1 or 2 further characterized,
   in that the first portion is composed of a skid-resistant urethane,
   secondly, in that the second portion is composed of a shock absorbing, low compression set cellular urethane and
   thirdly, that the integrating material is compatible with the aforesaid first and second portions and effective to join the said first and second portions into a structurally integral member.

4. A stationary skid resistant and vibration dampening member for maintaining a structure with which said member is associated in a fixed relationship to a support surface, said member including, in combination,
   a first portion, said portion being composed of a material having characteristics, with respect to texture and deformability, of non-rigid cellular foam, and having therefore the characteristics of high absorption of vibratory shocks per unit volume of material, and
   a second portion, said portion being composed of a material having characteristics, with respect to texture and deformability, of rubber, and having a high co-efficient of friction, and
   an integrating material which joins the first portion to the second portion in a non-tensioned manner which obliterates a sharp line of demarcation beween the two portions
   to thereby form a structurally integral, non-tensioned skid resistant and vibration dampening member.

5. The stationary skid resistant and vibration dampening member of claim 4 further characterized by and including
   adhesive means associated with at least one exterior bearing surface of said member.

6. The stationary resistant and vibration dampening member of either claim 4 or claim 5 further characterized
   firstly, in that the first portion is composed of a skid resistant urethane,
   secondly, in that the second portion is composed of a shock absorbing, low compression set cellular urethane and
   thirdly, that the integrating material is compatible with the aforesaid first and second portions and effective to join the said first and second portions into a structurally integral member.

* * * * *